(12) United States Patent
Himmanen et al.

(10) Patent No.: US 8,009,685 B2
(45) Date of Patent: Aug. 30, 2011

(54) SIGNALLING THE PRESENCE OF EXTENSION FRAMES

(75) Inventors: Heidi Himmanen, Turku (FI); Harri J. Pekonen, Raisio (FI); Jussi Vesma, Turku (FI)

(73) Assignee: Nokia Corporation (FI)

( * ) Notice: Subject to any disclaimer, the term of this patent is extended or adjusted under 35 U.S.C. 154(b) by 828 days.

(21) Appl. No.: 12/024,355

(22) Filed: Feb. 1, 2008

(65) Prior Publication Data

US 2009/0196217 A1 Aug. 6, 2009

(51) Int. Cl.
*H04L 12/28* (2006.01)
*H04L 12/56* (2006.01)
*H04J 3/16* (2006.01)
*H04J 3/22* (2006.01)

(52) U.S. Cl. ........................................ 370/410; 370/470
(58) Field of Classification Search .................... 370/328
See application file for complete search history.

(56) References Cited

U.S. PATENT DOCUMENTS

| 2003/0152107 | A1 | 8/2003 | Pekonen | |
|---|---|---|---|---|
| 2005/0005304 | A1* | 1/2005 | Kaul et al. | 725/118 |
| 2006/0282749 | A1* | 12/2006 | Guo | 714/776 |
| 2007/0025236 | A1* | 2/2007 | Ma et al. | 370/208 |
| 2008/0095195 | A1* | 4/2008 | Ahmadi et al. | 370/478 |
| 2008/0198774 | A1* | 8/2008 | Li | 370/280 |
| 2008/0232270 | A1* | 9/2008 | Fleming et al. | 370/254 |
| 2009/0052387 | A1* | 2/2009 | Lee et al. | 370/329 |
| 2009/0067377 | A1* | 3/2009 | Talukdar et al. | 370/329 |
| 2009/0161591 | A1* | 6/2009 | Ahmadi et al. | 370/312 |
| 2010/0278123 | A1* | 11/2010 | Fong et al. | 370/329 |

FOREIGN PATENT DOCUMENTS

WO 2006123208 A2 11/2006

OTHER PUBLICATIONS

ETSI TR 102 377 V1.2.1 (Nov. 2005) Digital Video Broadcasting (DVB); DVB-H Implementation Guidelines: Section 5 Link Layer elements: time slicing and MPE-FEC, pp. 17-34.
Faria, G. et al. "DVB-H: Digital broadcast services to handheld devices", Proceedings of the IEEE, vol. 94 No. 1, pp. 194-209, Jan. 2006.
International Search Report from International Application No. PCT/FI2009/000013, dated May 25, 2009, 13 pages.

* cited by examiner

*Primary Examiner* — Andrew Chriss
(74) *Attorney, Agent, or Firm* — Banner & Witcoff, Ltd.

(57) ABSTRACT

Aspects of the invention are directed to signalling extension frames in a telecommunication system. Extension-frame-signalling data may signal whether one or more extension parts are present in one or more gaps in time between data frames, when the one or more extension parts occur, and one or more durations for the one or more extension parts. The one or more extension parts may occur on the same radio frequencies as the data frames. The extension-frame-signalling data may signal when the one or more extension parts occur by signalling after which of one or more data frames in a super frame the extension parts occur. The one or more durations for the extension parts may be expressed in units of time.

32 Claims, 5 Drawing Sheets

SIGNALLING THE PRESENCE OF EXTENSION FRAMES

FIELD

Embodiments relate generally to communications networks. More specifically, embodiments relate to signalling the presence of extension frames in telecommunication systems.

BACKGROUND

Digital broadband broadcast networks enable end users to receive digital content including video, audio, data, and so forth. Using a digital video broadcast receiver or a suitable mobile terminal, a user may receive digital content over a wireless digital broadcast network. Digital content can be transmitted in a cell within a network. A cell may represent a geographical area that may be covered by a transmitter in a communication network. A network may have multiple cells, and cells may be adjacent to other cells.

A receiver device, such as a mobile terminal, may receive a program or service in a data or transport stream. The transport stream carries individual elements of the program or service such as the audio, video, and data components of a program or service. Typically, the receiver device locates the different components of a particular program or service in a data stream through Program Specific Information (PSI) or Service Information (SI) embedded in the data stream. However, PSI or SI signalling may be insufficient in some wireless communications systems, such as Digital Video Broadcasting-Handheld (DVB-H) systems. Use of PSI or SI signalling in such systems may result in a sub-optimal end user experience as the PSI and SI tables carrying in PSI and SI information may have long repetition periods. In addition, PSI or SI signalling requires a relatively large amount of bandwidth which is costly and also decreases efficiency of the system.

The data transmission in certain digital video broadcast systems, e.g., Digital Video Broadcast-Terrestrial Second Generation (DVB-T2) is defined to be Time Division Multiplex (TDM) and possibly in addition frequency hopping (Time Frequency Slicing). Thus, Time-Frequency slots are assigned to each service. Further, different levels of robustness (i.e. coding and modulation) may be provided for the services. Considering the foregoing and other signalling factors, a relatively large amount of signalling information is involved. The signalling is transmitted in preamble symbols called P2 symbols following the P1 symbol.

Open System Interconnection (OSI) layer L1 (physical layer) signaling is divided into L1-pre (signalling) and L1 signalling, where L1-pre is of static size while the size of L1 varies as the amount of Physical Layer Pipes (PLPs) varies. L1-pre signalling acts as a key to the L1 signalling by signalling its transmission parameters, i.e., size, code rate, modulation, and the like. To enable the receiver to start receiving services, reception of L1-pre should be possible without other preliminary information than what is obtained from the reception of pilot or preamble symbol P1 (including FFT-size, guard interval (GI), Frame type).

Future Extension Frames (FEF) (also referred to herein as extension frames) are not part of a particular signalled telecommunication system. Instead the extension frames are separated in time from frames of data of the telecommunication system. Extension frames can be considered as 'black holes' between frames carrying the services of the telecommunication system in that a receiver may not be able to receive (i.e., extract meaningful information from) the extension frames. But the receiver should know when in time the extension frames occur so that the receiver can ignore the extension frames in case the receiver is not able to receive the extension frames.

As such, a signalling scheme that allows a transmitter to inform the receivers when the FEFs are scheduled would advance the art.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Aspects of the invention are directed to signalling extension frames in a telecommunication system. Extension-frame-signalling data may signal whether one or more extension parts are present in one or more gaps in time between data frames, when the one or more extension parts occur, and one or more durations for the one or more extension parts. The one or more extension parts may occur on the same radio frequencies as the data frames. The extension-frame-signalling data may signals when the one or more extension parts occur by signalling after which of one or more data frames in a super frame the extension parts occur. The one or more durations for the extension parts may be expressed in units of time.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
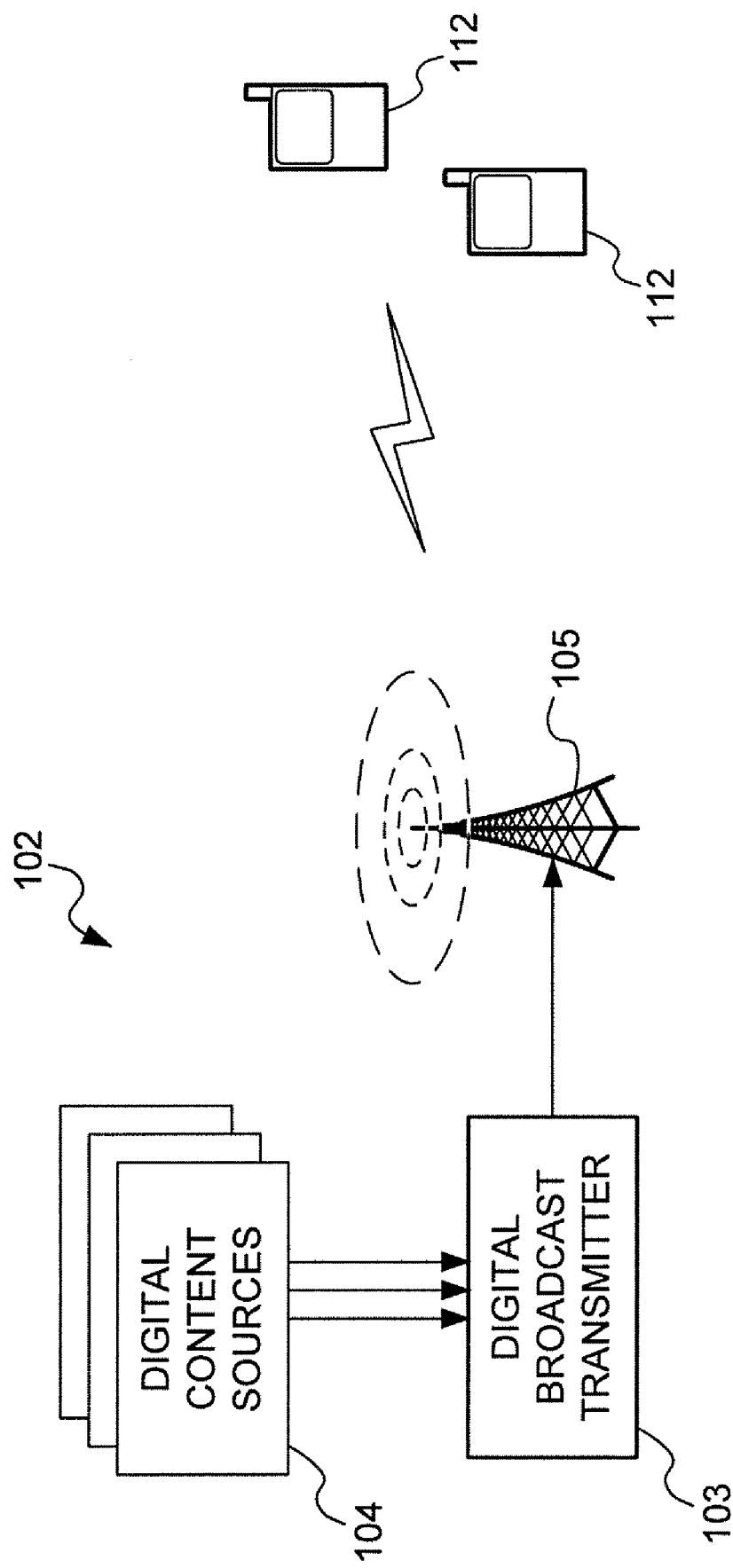
FIG. 1 illustrates a suitable digital broadband broadcast system in which one or more illustrative embodiments of the invention may be implemented.

FIG. 1 illustrates a suitable digital broadband broadcast system 102 in which one or more illustrative embodiments may be implemented. Systems such as the one illustrated here may utilize a digital broadband broadcast technology, for example Digital Video Broadcast-Handheld (DVB-H) or next generation Digital Video Broadcasting-Terrestrial (DVB-T2) or Digital Video Broadcasting-Handheld (DVB-H2) networks. Examples of other digital broadcast standards which digital broadband broadcast system 102 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple digital content data streams from multiple digital content sources 104. In various embodiments, the digital content data streams may be IP streams. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
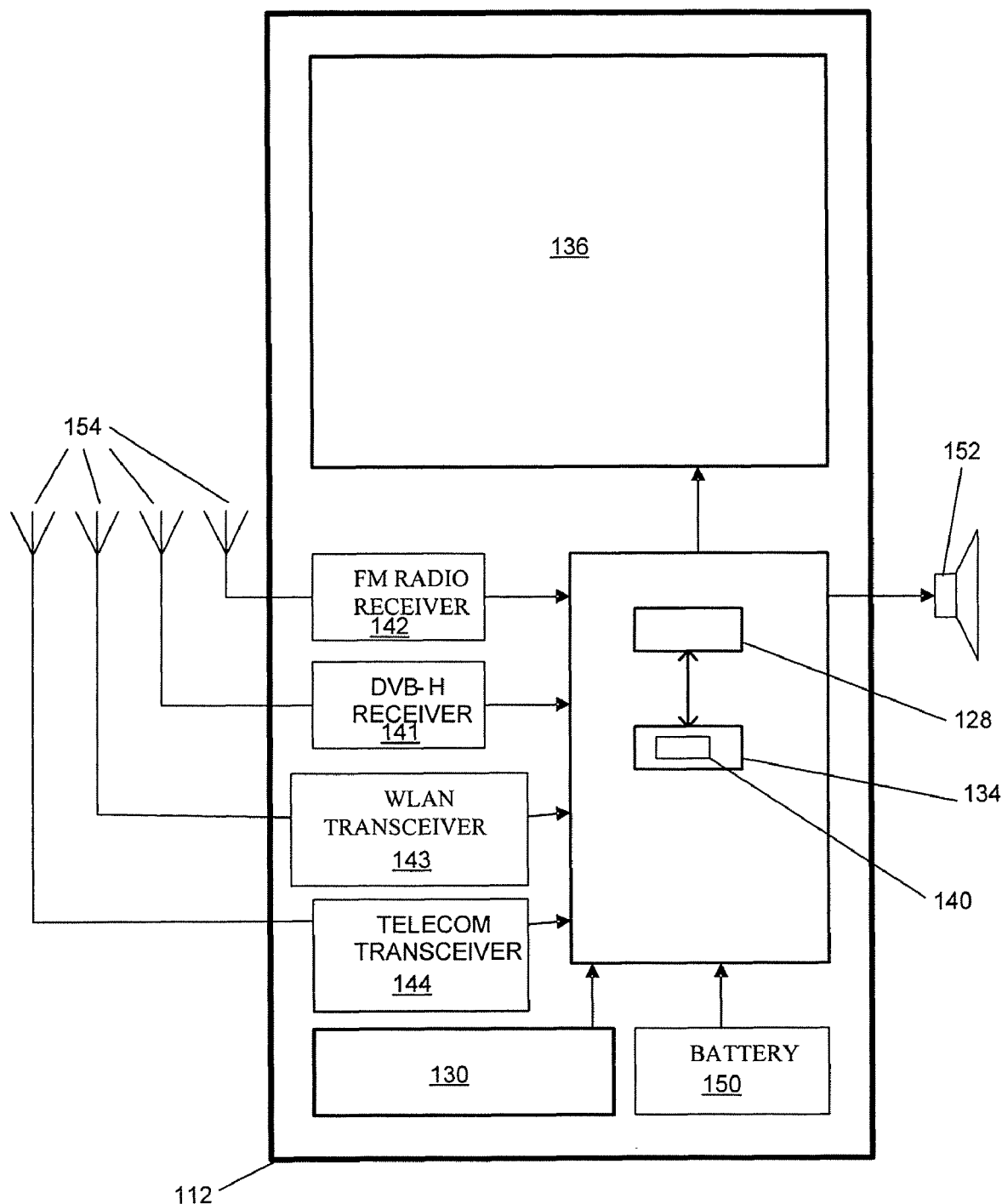
FIG. 2 illustrates an example of a mobile device in accordance with an aspect of the present invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as handheld DVB-H/H2 or terrestrial DVB-T/T2, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. Mentioned receivers may be separate receiver chipsets or combination of the previous or receiver functionality may be integrated together with some other functionality within receiver device 112. The receiver device may also be a software defined radio (SDR). In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an electronic service guide may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol (IP). Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having an unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Figure 3:
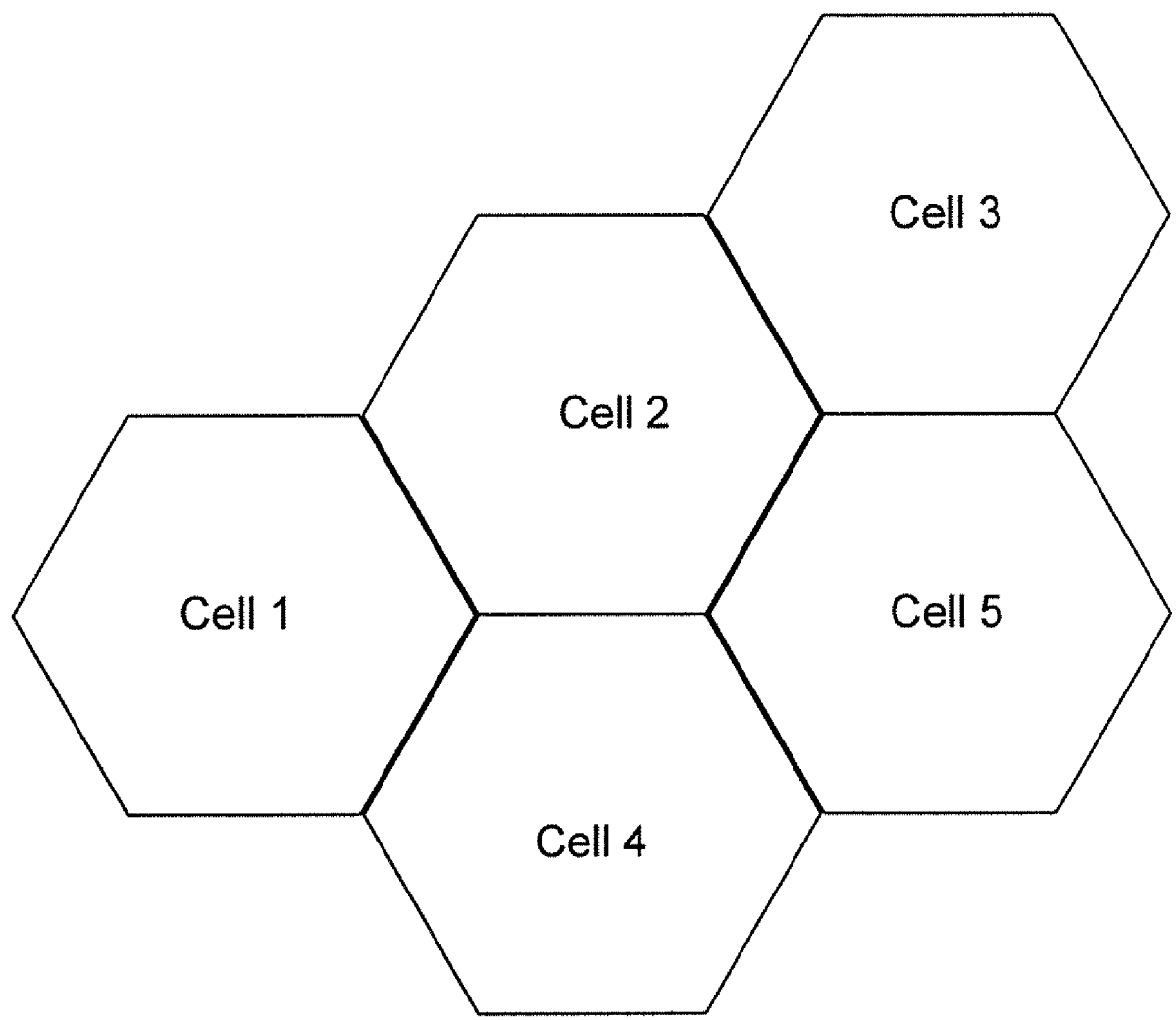
FIG. 3 illustrates an example of cells schematically, each of which may be covered by a different transmitter in accordance with an aspect of the present invention.

In a typical communication system, a cell may define a geographical area that may be covered by a transmitter. The cell may be of any size and may have neighboring cells. FIG. 3 illustrates schematically an example of cells, each of which may be covered by one or more transmitter each transmitting in the same frequency. In this example, Cell 1 represents a geographical area that is covered by one or more transmitter transmitting on a certain frequency. Cell 2 is next to Cell 1 and represents a second geographical area that may be covered by a different frequency. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

Certain embodiments are directed to transmission of Open System Interconnection (OSI) layers L1 (Physical layer) and L2 (Data Link Layer) signalling in Digital Video Broadcasting-Terrestrial Second Generation (DVB-T2) system preamble symbols. Such embodiments enable the transmission of L1 and L2 signalling and thus make it possible for the receiver to discover and receive services. L1 signalling provides information on the physical layer of the system, and L2 provides information on the mapping of services to the physical layer.

Figure 4:
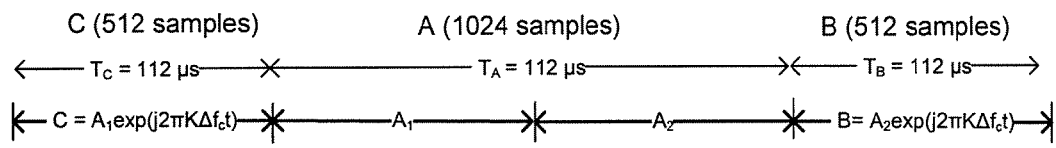
FIG. 4 shows an example P1 structure in accordance with certain embodiments.

FIG. 4 shows an example P1 structure in accordance with certain embodiments. The P1 symbol shown in FIG. 4 consists of a 1 k Orthogonal Frequency Division Multiplexing (OFDM) symbol (part A), which is Differential Binary Phase Shift Keying (DBPSK) modulated in frequency direction by a set of binary sequences. In addition to the main symbol part A, the P1 symbol includes two frequency shifted cyclic extensions. Part C is a frequency shifted version of the first half of A (A1), and B is similarly a frequency shifted version of the latter half of A (A2). Parts C and B thus contain together the same information as part A. The frequency shift is K subcarriers for both C and B.

The Pseudo Random Binary Sequence (PRBS) is called the modulation signaling sequence (MSS), and it carries signaling information. In one embodiment, the P1 may signal: FFT size (3 bits), guard interval (GI) (2 bits), current type of FEF (Future Extension Frame) (2 bits), type(s) of other FEF frames (2 bits), use of Multiple Input Single Output (MISO) system (1 bit), use of Peak-to-Average Power Ratio (PAPR) pilots (1 bit), P2 type (3 bits) which tells the type of the following P2 symbol. These types may include P2 symbols for the second generation DVB-T2, next generation handheld (NGH), Multiple Input Multiple Output (MIMO), or Multiple Input Single Output (MISO).

In one embodiment, the L1 signaling is divided into two sections, as shown in the following Table.

| L1 pre-signalling | L1 signalling |
|---|---|
| TYPE [8b] | // Static param |
| RESERVED [16b] | CELL_ID [16b] |
| L1_COD [3b] | NETWORK_ID [16b] |
| L1_MOD [4b] | TFS_GROUP_ID [16b] |
| L1_FEC_TYPE [1b] | NUM_RF [3b] |
| L1_SIZE [18b] | RF_IDX [3b] |
| NUM_SYMBOLS [5b] | for each RF { |
| BW_EXT [1b] |    FREQUENCY [32b] |
| CRC-32 [32b] | } |
| | PILOT_PATTERN [3b] |
| | FRAME_LENGTH [10b] |
| | // Configurable param |
| | NUM_PLP [8b] |
| | RF_SHIFT [8b] |
| | for each PLP { |
| |    PLP_ID [8b] |
| |    PLP_GROUP_ID [8b] |
| |    PLP_COD [3b] |
| |    PLP_MOD [4b] |
| |    PLP_FEC_TYPE [1b] |
| | } |
| | PLP0_COD [3b] |
| | PLP0_MOD [4b] |
| | PLP0_FEC_TYPE [1b] |
| | // Dynamic param |
| | FRAME_IDX [8b] |
| | NOTIFICATION [1b] |
| | L2_SIZE [18b] |
| | NOTIF_SIZE [18b] |
| | for each PLP { |
| |    PLP_NUM_BLOCKS [8b] |
| |    PLP_START [18b] |
| | } |
| | CRC-32 [32b] |

The parameters and their indicated values are shown as an exemplary embodiment. The number and values of the parameters may vary in different embodiments. The first section, called L1 pre-signaling, uses a predetermined code rate and modulation, e.g. ¼ code rate and Quadrature Phase Shift Keying (QPSK), of relatively high robustness. It contains a minimal set of the L1 signaling parameters, including the code rate and modulation for the second section. The second section, called L1 signaling, contains most of the L1 signaling parameters. Its coding rate and modulation is configurable, being signaled in the first section.

The advantage of splitting the L1 signaling is for achieving higher transmission efficiency, since most of the L1 signaling data is transmitted in the second section using a configurable and more efficient code rate and modulation. The minimal L1 signaling data in the first section has a fixed worst-case code rate and modulation and can be decoded by the receiver right away, without any signaling except P1 information. Thus, the first L1 section (L1-pre) acts as a key to the second one.

PLP0 is a special kind of PLP, which is dedicated to carriage of L2 and Notification data. The L2 signaling data is assumed to be present within PLP0, while the presence of the Notification data may change from frame to frame.

The signaling information carried within a frame typically refers to the next frame or the frame after the next frame.

The following table contains L2 signalling parameters.

| L2 signalling |
|---|
| // Network related |
| cell_id [16b] |
| network_id [16b] |
| frequency [32b] |
| // Service related (new) |
| service_id { |
|   plp_id [8b] |
|   frame loop { |
|     frame_idx [8b] |
|   } |
| } |

The L1 signaling parameters are designed in such a way that T2 specific amendments to the Program Specific Information/Service Information (PSI/SI) as specified in first generation DVB-T systems are minimal. As can be seen from the L2 signalling table above, the new L2 data is the description of how each service is mapped onto the Time Frequency Slicing (TFS) structure.

The main task of the L1 pre-signalling is to tell the receiver how to receive the rest of the L1 signaling. Various L1 pre-signalling fields will now be discussed.

TYPE: This composite field includes information describing for example: (1) the transmission system: DVB-T2, DVB-H2, or future extensions; (2) the diversity scheme: examples thereof are Multiple Input Multiple Output (MIMO), Multiple Input Single Output (MISO), and their type; and (3) the used protocols for the services: Transport Stream (TS), Generic Stream Encapsulation (GSE).

L1_COD: Code rate of the main L1 signaling data block.

L1_MOD: Modulation of the main L1 signaling data block.

L1_FEC_TYPE: FEC block size used for the main L1 signaling data block.

L1_SIZE: Size of the main L1 signaling data block, in OFDM cells.

NUM_SYMBOLS: The total number of symbols used for carrying the L1 pre-signaling and L1 signaling. This parameter is used by the receiver in order to buffer a sufficient number of symbols, prior to decoding and de-mapping the relevant parts.

BW_EXT: Bandwidth extension flag, to signal the use of extended bandwidth for 16K and 32K modes.

CRC-32: This field ensures that the L1 pre-signaling data is error free.

The L1 pre-signaling data block is received without the help of any other signaling, so the following should be pre-determined: (1) code rate and modulation, (2) block size, and (3) cell mapping onto the P2 preamble. As L1 pre-signaling contains only static parameters, which do not change during normal operation, receiver may in one embodiment receive and combine information from several frames and so improve robustness.

The L1 signaling, shown in the right column of the L1 Signalling table above, conveys information that enables the discovery and reception of PLPs. In one embodiment, it is further subdivided into three groups of parameters, according to their updating frequency: static, configurable, and dynamic.

Static parameters are fundamental network parameters, which do not change during normal operation. Several static parameters will now be discussed.

CELL_ID: This is a 16-bit field which uniquely identifies a cell.

NETWORK_ID: This is a 16-bit field which serves as a label to identify the delivery system, about which the Network Information Table (NIT) informs, from any other delivery system. Allocations of the value of this field are found in ETR 162 [ETSI Technical Report: Digital broadcasting systems for television, sound and data services; Allocation of Service Information (SI) codes for Digital Video Broadcasting (DVB) systems].

TFS_GROUP_ID: This uniquely identifies a TFS group when multiple TFS groups coexist.

NUM_RF: Number of RF channels in the TFS group.

RF_IDX: Index of the current RF channel within its TFS structure, between 0 and NUM_RF-1.

FREQUENCY: Carrier frequency (channel center frequency including possible offset) for each RF channel in the TFS group. The order of frequencies is implicit from the loop order. The receiver can also discover these frequencies by itself during the initial scan, so under certain circumstances these parameters may not be needed.

PILOT_PATTERN: pilot pattern used for the data OFDM symbols.

FRAME_LENGTH: number of data OFDM symbols per frame.

Configurable parameters change rarely, e.g., when services are added or removed. Several configurable parameters will now be discussed.

NUM_PLP: Number of PLPs in the TFS multiplex.

RF_SHIFT: Incremental shift, in terms of OFDM symbols, between adjacent RF channels. Under certain circumstances, this parameter may change from frame to frame, in which case it belongs in the dynamic parameters category.

PLP_ID: ID of each PLP. Using IDs instead of indices enables a more flexible allocation of the PLPs within the TFS multiplex.

PLP_GROUP_ID: Specifies the PLP group, into which the PLP belongs.

PLP_COD: Code rate of each PLP.

PLP_MOD: Modulation of each PLP.

PLP_FEC_TYPE: FEC block size for each PLP (0=16200, 1=64800).

PLP0_COD: Code rate of PLP0 (signaling PLP).

PLP0_MOD: Code rate of PLP0 (signaling PLP).

PLP0_FEC_TYPE: FEC block size for PLP0 (0=16200, 1=64800).

Dynamic parameters change for each frame. Several dynamic parameters will now be discussed.

FRAME_IDX: Index of the current frame (0 . . . SUPER_FRAME_LENGTH).

NOTIFICATION: This field indicates if notification data is present in the current frame.

PLP_NUM_BLOCKS: Number of FEC blocks in the current frame, for each PLP.

PLP_START: Start address of each PLP. Actually, what is signaled is the start address of the first slot in RF0. As the incremental time offset (shift) between adjacent RF channels is assumed to be constant, the start addresses of the slots in the other RF channels can be computed by the receiver. Therefore, there is no need for signaling the start addresses of each RF channel.

L2_SIZE: Size of the L2 data in PLP0 for the current frame. It is used for separating L2 data from notification data in PLP0.

NOTIF_SIZE: Size of the notification in PLP0 for the current frame. It is used for separating notification data from L2 data in PLP0.

The sizes of the slots in the TFS structure do not need to be signaled explicitly. It is enough to signal the number of FEC blocks in each PLP, from which the number of OFDM cells per PLP can be computed knowing the constellation size. Once the number of OFDM cells per frame per PLP is known, the size of each slot can be computed assuming that slots have the same size, up to a single cell.

The L2 signaling includes PSI/SI signaling information that describes the mapping of the services within the transport stream and onto the TFS multiplex. The latter means that PSI/SI is amended to enable end-to-end mapping of the services onto the PLPs of the TFS frame. The TFS frame duration sets the minimum repetition interval of any PSI/SI table. L2 signaling data is carried within PLP0, together with the Notification data (when available).

Co-scheduled signaling means that the dynamic L1 signaling data specific to a PLP, i.e. slot allocation, is multiplexed with the payload data of that particular PLP. This allows the receiver following a particular service to get the dynamic L1 signaling information without having to receive P2 every frame.

The notification channel can be used for transmitting notifications and carousel data, which are available to the receiver regardless of which PLP is being received. The Notification data is carried within PLP0, together with the L2 signaling data.

Figure 7:
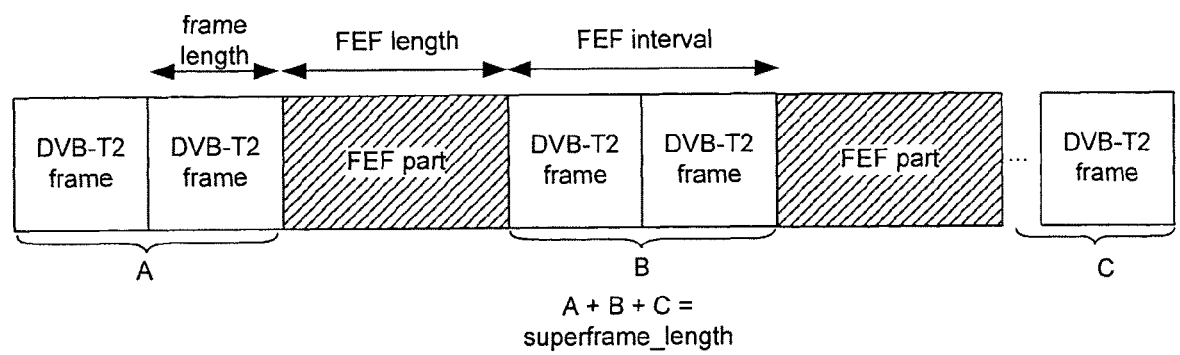
FIG. 7 is a schematic diagram showing an example of extension frames separated in time from data frames in accordance with certain embodiments.

Certain embodiments are related to signalling the presence of Future Extension Frames (FEF) (also referred to herein as extension frames) in a broadcast system. As mentioned above, the extension frames are not part of the current definition of the system, but can be define e.g. in a future extension of the broadcast system. Instead the extension frames are separated in time from frames of broadcast data of the current system. Extension frames can be considered as 'black holes' between frames carrying the services of the broadcast system in that a receiver may not be able to receive (i.e., extract meaningful information from) the extension frames. But the receiver should know when in time the extension frames occur so that the receiver can ignore the extension frames in case the receiver is not able to receive the extension frames. Future extension frame (FEF) insertion enables carriage of frames defined in a future extension of the DVB-T2 standard in the same multiplex with regular DVB-T2 frames. The future extension frames and DVB-T2 frames are separated in time as depicted in FIG. 7.

Certain embodiments are directed to the second generation Digital Video Broadcasting-Terrestrial (DVB-T2, also referred to as T2) systems. Other embodiments are applicable to any telecommunication system.

Figure 5:
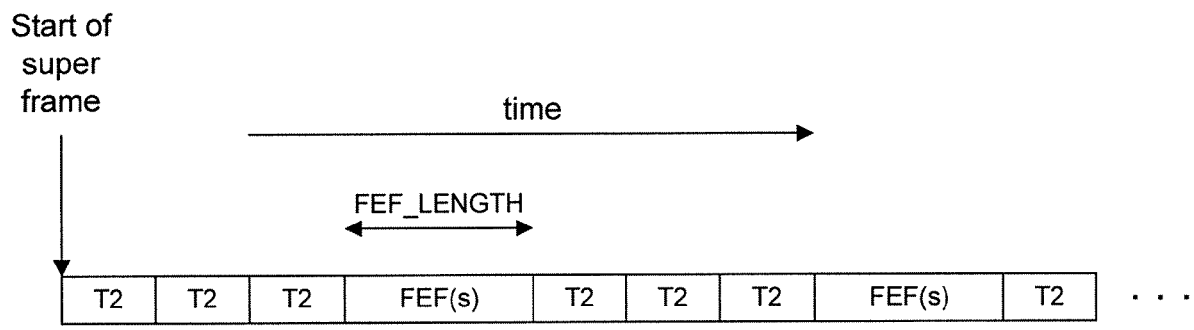
FIG. 5 is a schematic diagram showing an example of extension frames separated in time from data frames in accordance with certain embodiments.

In one embodiment the FEFs are not numbered the same way as the DVB-T2 frames and can be transmitted using a scheme not known to DVB-T2 receivers. FIG. 5 is a schematic diagram showing an example of extension frames separated in time from DVB-T2 frames in accordance with certain embodiments. An FEF part may include one or more FEFs that occur on the same radio frequencies but that are separated in time from the T2 frames. As such, a DVB-T2 receiver should know the length and the location of possible FEFs.

In accordance with certain embodiments, a receiver is informed after which T2 frame in a superframe an FEF part occurs. The superframe may include multiple T2 frames. The receiver may be told after which frame the FEF part occurs and the length of the FEF part. Also, the receiver may be told how often the FEF part occurs. According to one embodiment, there is the same amount of T2 frames between FEF parts during a particular superframe. This does not have to be the case, however, if the parameters are inserted in the dynamic part of the signalling, which changes from frame to frame. The detection of FEFs is enabled by the static L1 signalling carried in the P2 symbols. The static L1 fields signals the size and structure of the superframe. In one embodiment, the FEF may begin with a P1 symbol that can be detected by DVB-T2 receivers. Other parts of the FEFs may be defined in future.

Signalling for an exemplary embodiment is disclosed below. The parameters and fields are exemplary and are not limiting. The number of bits in each field is shown with the abbreviation "b" in square brackets.

The L1 static signalling may include signalling of the location of the FEF part to enable T2 receivers to ignore FEFs. For example:

```
SUPER_FRAME_LENGHT [8b]
FEF_IN_USE [1b]
if FEF_IN_USE == '1' {
    FEF_TYPE [4b]
    FEF_LENGTH [18b]
    FEF_START_FRAME_IDX [8b]
    FEF_INTERVAL [8b]
}
```

SUPER_FRAME_LENGTH: This field describes the length of a superframe in T2 frames, excluding the FEF parts.

FEF_IN_USE: This parameter is used for signalling the presence of the FEF part and the following loop. This bit shall be set to '1' if the superframe contains future extension frames. If this parameter is set to '0', FEF is not in use and the loop is not existing.

FEF_TYPE: This field will describe the content, e.g. type or version, of the future extension frames in the multiplex. The field is reserved for future use. This field is optional.

FEF_LENGTH: The length of the FEF part may be expressed in time units, for example in 0.1 milliseconds. Maximum value using 18 bits is 262144, which represents 26.2144 seconds. In other embodiments the length of the FEF part may be expressed in number of symbols or even in number of frames. If the symbol or frame lengths vary, the symbol and/or frame lengths may also be signalled. This part is the duration of the 'black hole', during which T2 services are not transmitted, and may include multiple FEFs. The value should be rounded down, as the receiver should 'wake up' (i.e., start searching for P1 symbols) before the preamble(s) of the next T2 frame, if a desired service is transmitted in that frame. The length of the FEF part may, in one embodiment, remain constant during a particular super frame.

FEF_START_FRAME_IDX: This parameter indicates after which frame, from the beginning of the super frame, the FEF part occurs. For example, setting this parameter to $3_{dec}$, indicates that the FEF part occurs after the third frame.

FEF_INTERVAL: This parameter indicates how often the FEF part occurs in frames. For example, setting this parameter to $3_{dec}$, indicates that the FEF part occurs after every three T2 frames. In one embodiment, this may be the same as FEF_START_FRAME_IDX. In this embodiment, the parameter describes the amount of DVB-T2 frames between each FEF part and in the beginning of the superframe before the first FEF part.

Certain embodiments may signal the presence and location of any sequence in time that does not carry a desired service. Although an implementation for DVB-T2 systems is discussed below, certain embodiments are well suited to any type of system in which one or more desired services are transmitted in frames, and there are frames in the same frequency band that do not carry data that can be decoded or received by the receiver.

In addition to the L1 signalling carried in the P2 symbols, the P1 symbols will carry signalling indicating the presence of FEFs. In one embodiment, two out of the total seven P1 bits may be used for signaling the system version and use of FEF. In such an embodiment, the signaling could, as an example, look like:

'00'=T2 frames only (pure T2 system=T2v1)
'01'=Reserved for Future Use (e.g. T2v2, e.g. MIMO)
'10'=Reserved for Future Use (e.g. NGH (Next Generation Handheld))
'11'=Mixed system, incl. T2 frames and FEF The Future Extension Frame is included in the DVB-T2 specification to enable transmission that cannot be decoded or received with receivers addressing the first phase of the DVB-T2 specification. Such transmission could be, for example, MIMO (Multiple Input, Multiple Output). MIMO transmission has the advantages of a more robust signal or higher capacity, but MIMO reception requires two antennas or tuners and a MIMO system block. MIMO pilot signals will probably be different from the current pilot design in T2. As such, the T2 receiver addressing the first phase will probably not be able to receive future MIMO signals. Therefore, the phase 1 T2 receivers should be able to ignore Future Extension Frames carrying, e.g. MIMO, which can be accomplished in accordance with certain embodiments.

The super frame signalling will indicate the amount of T2 frames in one super frame. As the FEF frames might have very different content and structure, it might not be possible for the T2 receiver to calculate the length of the FEF part in frames or OFDM symbols. Further, the length of the Future Extension Frames might be different from the length of T2 frames and the FFT size, thus the length of the symbols might not be known to the T2 receiver. The FEFs might not even be using OFDM transmission at all. Therefore, the length of the FEF part may be expressed in time rather than in symbols or frames. Alternatively, the length of the FEF part may be expressed as the amount of samples in the receiver, when the sampling time or frequency is defined for the receiver. This may be done by the FEF_LENGTH field. It might also not be practical to include the Future Extension Frames in the number of frames in a super frame, but rather only calculate the number of T2 frames in a super frame and express where the gaps, i.e. FEF parts, occur during the super frame.

In one embodiment the L1 signalling is as shown below. The shown parameters and field lengths are exemplary for the embodiment. Also, the classification of parameters into static, configurable, and dynamic may be different in various embodiments.

```
// Static parameters
CELL_ID [16b]              Uniquely identifies a network transmitter
NETWORK_ID [16b]           Serves as a label to identify the delivery system, about
                           which the NIT informs, from any other delivery system.
                           Allocations of the value of this field are found in ETR
                           162.
T2_SYSTEM_ID [8b]          This uniquely identifies a T2 system when multiple T2
                           systems coexist.
NUM_RF [3b]                Number of RF channels
RF_IDX [3b]                Index of the current RF channel within its TFS structure,
                           between 0 and NUM_RF − 1.
for each RF {
    FREQUENCY [32b]        Carrier frequency (RF channel center frequency including
                           possible offset) for each RF channel in the TFS group.
}
PILOT_PATTERN [3b]         pilot pattern used for the data OFDM symbols
// SUPERFRAME
    FRAME_LENGTH_T2 [10b]  Number of OFDM symbols in a T2 frame, max 1024.
    SUPER_FRAME_LENGTH     Number of frames in a super frame, max 256.
[8b]
    FEF_in_use [1b]        This parameter is used to signal the presence of the FEF
                           part and the following loop. If this parameter is set to '0',
                           FEF is not in use.

If FEF_in_use == '1' {
        FEF_TYPE [4b]      The type and version of the content of the FEF (not
                           necessarily required).
        FEF_LENGTH [18b]   The length of the FEF part in expressed in units of 0.1
                           milliseconds.
    FEF_START_FRAME_IDX[8b] This parameter tells after which frame from the beginning
                           of the super frame the FEF part occurs.
        FEF_INTERVAL [8b]  How often the FEF part occurs in frames
    }
}
// Configurable parameters
NUM_OF_PLPS [10b]          PLPs (physical layer pipes) in the T2 system max 1024.
SHIFT [8b]                 This 8-bit field indicates the shift, in terms of OFDM
                           symbols, between consequent bursts in a frame. In the
                           case where TFS mode is used, this field indicates also the
                           shift between RF frequencies in a T2 system.

For each PLP {
    PLP_ID [10b]           Unique ID for a PLP
    PLP_COD [4b]           Code rate for the PLP
```

| | |
|---|---|
| PLP_MOD [3b] | Modulation for the PLP |
| PLP_FEC_TYPE [2b] | Length of FEC block used for the PLP |
| PLP_START_RF_IDX [3b] | The first shift in the frame, where the PLP occurs. This is needed if the amount of bursts for a PLP during one frame is less than the amount of shifts. |
| BURSTS_PER_FRAME [3b] | Number of bursts during one frame for a PLP |
| BURSTS_PER_FEC [3b] | Number of bursts that are covered by the time interleaver. |
| } | |
| // Dynamic parameters | |
| FRAME_IDX [8b] | The index of the current frame (0 ... SUPER_FRAME_LENGTH). A frame index only occurs once in every superframe. |
| NOTIFICATION [1b] | This field indicates if notification data is present in the current frame. |
| L2_SIZE [18b] | Size of the L2 data in PLP0 for the current frame. It is used for separating L2 data from notification data in PLP0. |
| NON_SHIFTED_RF_IDX [3b] | The RF that is signalled in PLP_START. For DVB-T2 "mode B," this is the first shift. |
| NOTIF_SIZE [18b] | Size of the notification in PLP0 for the current frame. It is used for separating notification data from L2 data in PLP0 |
| NUM_PLP [8b] | Number of PLPs carried in the current frame. |
| for each PLP { | |
| PLP_ID [8b] | |
| PLP_START [18b] | Start address of each PLP. Actually, what is signalled is the start address of the first slot in the non shifted RF. As the incremental time offset (shift) between adjacent RF channels is assumed to be constant, the start addresses of the slots in the other RF channels can be computed by the receiver. Therefore, there is no need for signalling the start addresses in all RF channels. |
| } | |
| CRC-32 [32b] | Check sum to ensure that the L1 signalling was received correctly. |

Figure 6:
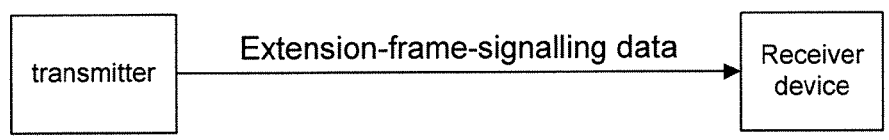
FIG. 6 is a schematic diagram showing transmission and reception of extension-frame-signalling data in accordance with certain embodiments.

FIG. 6 is a schematic diagram showing transmission and reception of extension-frame-signalling data, of the type discussed above, in accordance with certain embodiments.

In accordance with certain embodiments, a relatively small amount of overhead is introduced for signalling the presence of extension frames. If FEFs are not present in the system, a single bit is added to each frame. If FEFs are present, 27-39 additional bits are introduced.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
transmitting, in signalling data included in one or more data frames of a super frame, extension-frame-signalling data that includes one or more parameters of one or more extension parts occurring between data frames of the super frame, wherein the one or more parameters indicate when the one or more extension parts occur in the super frame and indicate one or more durations of the one or more extension parts.

2. The method of claim 1, further comprising: transmitting the one or more extension parts on the same radio frequencies as the one or more data frames of the super frame.

3. The method of claim 1, wherein a first parameter of the one or more parameters indicates when a first extension part of the one or more extension parts occurs in the super frame by including a value representative of a frame index of a data frame within the super frame after which the first extension part occurs.

4. The method of claim 1, wherein a first parameter of the one or more parameters indicates how often the one or more extension frame parts occur.

5. The method of claim 4, wherein the first parameter indicates how often the one or more extension parts occur by including a value representative of an interval of data frames of the super frame that are between two of the one or more extension parts.

6. The method of claim 1, wherein the one or more durations are expressed in units of time.

7. An apparatus comprising:
a processor; and
a memory storing executable instructions configured to, with the processor, cause the apparatus to at least:
transmit, in signaling data included in one or more data frames of a super frame, extension-frame-signalling data that includes one or more parameters of one or more extension parts occurring between data frames of the super frame, wherein the one or more parameters indicate when the one or more extension parts occur in the super frame and indicate one or more durations of the one or more extension parts.

8. The apparatus of claim 7, wherein the memory further stores executable instructions configured to, with the processor, cause the apparatus to: transmit the one or more extension parts on the same radio frequencies as the one or more data frames of the super frame.

9. The apparatus of claim 7, wherein a first parameter of the one or more parameters indicates when a first extension part of the one or more extension parts occur occurs in the super frame by including a value representative of a frame index of a data frame within the super frame after which the first extension part occurs.

10. The apparatus of claim 7, wherein a first parameter of the one or more parameters indicates how often the one or more extension frame parts occur.

11. The apparatus of claim 10, wherein the first parameter indicates how often the one or more extension parts occur by including a value representative of an interval of data frames of the super frame that are between two of the one or more extension parts.

12. The apparatus of claim 7, wherein the one or more durations are expressed in units of time.

13. A method comprising:
receiving, in signaling data included in one or more data frames of a super frame, extension-frame-signalling data that includes one or more parameters of one or more extension parts occurring between data frames of the super frame, wherein the one or more parameters indicate when the one or more extension parts occur in the super frame and indicate one or more durations of the one or more extension parts.

14. The method of claim 13, further comprising: receiving the extension parts on the same radio frequencies as the one or more data frames of the super frame.

15. The method of claim 13, wherein a first parameter of the one or more parameters indicates when a first extension part of the one or more extension parts occurs by including a value representative of a frame index of a data frame within the super frame after which the first extension part occurs.

16. The method of claim 13, wherein a first parameter of the one or more parameters indicates how often the one or more extension frame parts occur.

17. The method of claim 16, wherein the first parameters indicates how often the one or more extension parts occur by including a value representative of an interval of data frames of the super frame that are between two of the one or more extension parts.

18. The method of claim 13, wherein the one or more durations are expressed in units of time.

19. An apparatus comprising
a processor; and
a memory storing executable instructions configured to, with the processor, cause the apparatus to at least:
receive, in signaling data included in one or more data frames of a super frame, extension-frame-signalling data that includes one or more parameters of one or more extension parts occurring between data frames of the super frame, wherein the one or more parameters indicate when the one or more extension parts occur and indicate one or more durations of the one or more extension parts.

20. The apparatus of claim 19, wherein the memory further stores executable instructions configured to, with the processor, cause the apparatus to: receive the extension parts on the same radio frequencies as the one or more data frames of the super frame.

21. The apparatus of claim 19, wherein the apparatus is not able to decode one or more extension frames within the one or more extension parts.

22. The apparatus of claim 19, wherein a first parameter of the one or more parameters indicates when a first extension part of the one or more extension parts occurs by including a value representative of a frame index of a data frame within the super frame after which the first extension part occurs.

23. The apparatus of claim 19, wherein a first parameters of the one or more parameters indicates how often the one or more extension frame parts occur.

24. The apparatus of claim 23, wherein the first parameter indicates how often the one or more extension parts occur by including a value representative of an interval of data frames of the super frame that are between two of the one or more extension parts.

25. The apparatus of claim 19, wherein the one or more durations are expressed in units of time.

26. A non-transitory computer readable medium storing executable instructions configured to, when executed, cause an apparatus to at least:
transmit, in signalling data included in one or more data frames of a super frame, extension-frame-signalling data that includes one or more parameters of one or more extension parts occurring between data frames of the super frame, wherein the one or more parameters indicate when the one or more extension parts occur in the super frame and indicate one or more durations of the one or more extension parts.

27. The non-transitory computer readable medium of claim 26, further storing executable instructions configured to, when executed, cause the apparatus to: transmit the one or more extension parts on the same radio frequencies as the one or more data frames of the super frame.

28. The non-transitory computer readable medium of claim 26, wherein the one or more extension parts are configured to include one or more extension frames that are not able to be decoded by a device that receives and decodes the super frame.

29. The non-transitory computer readable medium of claim 26, wherein a first parameter of the one or more parameters indicates when a first extension part of the one or more extension parts occurs by including a value representative of a frame index of a data frame within the super frame after which the first extension part occurs.

30. The non-transitory computer readable medium of claim 26, wherein a first parameter of the one or more parameters indicates how often the one or more extension frame parts occur.

31. The non-transitory computer readable medium of claim 30, wherein the first parameter indicates how often the one or more extension parts occur by including a value representative of an interval of data frames of the super frame that are between two of the one or more extension parts.

32. The non-transitory computer readable medium of claim 26, wherein the one or more durations are expressed in units of time.

* * * * *

UNITED STATES PATENT AND TRADEMARK OFFICE
CERTIFICATE OF CORRECTION

PATENT NO. : 8,009,685 B2  Page 1 of 1
APPLICATION NO. : 12/024355
DATED : August 30, 2011
INVENTOR(S) : Heidi Himmanen et al.

It is certified that error appears in the above-identified patent and that said Letters Patent is hereby corrected as shown below:

Column 15, Claim 9, Line 13:
Please delete "parts occur occurs" and insert --parts occurs--

Signed and Sealed this
Eighth Day of May, 2012

David J. Kappos
*Director of the United States Patent and Trademark Office*